United States Patent [19]

Balasubramanian

[11] 4,355,904
[45] Oct. 26, 1982

[54] OPTICAL INSPECTION DEVICE FOR MEASURING DEPTHWISE VARIATIONS FROM A FOCAL PLANE

[76] Inventor: N. Balasubramanian, 20361 Chalet La., Saratoga, Calif. 95070

[21] Appl. No.: 140,417

[22] Filed: Apr. 14, 1980

Related U.S. Application Data

[63] Continuation-in-part of Ser. No. 945,628, Sep. 25, 1978, Pat. No. 4,204,772.

[51] Int. Cl.³ .............................................. G01C 3/00
[52] U.S. Cl. ...................................... 356/376; 356/1; 356/4; 356/16
[58] Field of Search ..................... 356/3, 16, 372, 373, 356/375, 376, 381, 1, 4; 350/6.4, 171, 172

[56] References Cited

U.S. PATENT DOCUMENTS

| | | | |
|---|---|---|---|
| 3,378,687 | 4/1968 | Schepler | 350/6.4 |
| 3,539,263 | 11/1970 | Waters | 356/131 |
| 3,589,815 | 6/1971 | Hoskerman | 356/375 |
| 3,692,414 | 9/1972 | Hoskerman et al. | 356/376 |
| 3,715,165 | 2/1973 | Smith | 356/376 |
| 4,204,772 | 5/1980 | Balasubramanian | 356/16 |

Primary Examiner—R. A. Rosenberger
Attorney, Agent, or Firm—Thomas Schneck

[57] ABSTRACT

A scanning laser measurement system for measuring depthwise variations of surfaces relative to a focal plane of an optical system. Laser light is directed to a test surface, generally aligned with the focal plane, through focusing optics having an optical axis. Some of the light from a beam spot is retro scattered from the test surface and reimaged along a path generally parallel to the optical axis. Depthwise variations in the test surface with respect to the focal plane cause spatial displacements in the retrobeam relative to the optical axis. The retrobeam is directed to a filter which is partially reflective and partially transmissive. A pair of photodetectors is used to intercept reflected and transmitted components of the retrobeam and the intensity of these components is measured and used to compute centroid values for the retrobeam on the filter for various beam spots on the test surface. The computed centroid values are directly proportional to depthwise surface deviations from the focal plane. The beam is directed to various points on the test surface by an optical scanner. If the deviations in the test surface from the focal plane are so great that a retrobeam cannot be formed, the entire optical system is translated until beam focus can be achieved and a retrobeam formed. The extent of translation is a coarse measurement of depthwise variations in the test surface relative to the focal plane, while the previously mentioned centroid values yield a fine measurement of depthwise variations relative to the focal plane.

10 Claims, 17 Drawing Figures

ANGLE VECTOR WEDGE 1

ANGLE VECTOR WEDGE 2

VECTOR ADDITION OF ANGLE VECTORS

OPTICAL INSPECTION DEVICE FOR MEASURING DEPTHWISE VARIATIONS FROM A FOCAL PLANE

CROSS REFERENCE TO RELATED APPLICATION

This is a continuation-in-part of pending prior application Ser. No. 945,628, filed Sept. 25, 1978 now U.S. Pat. No. 4,204,772.

BACKGROUND OF THE INVENTION

1. Field of the Invention

The invention relates generally to optical measuring devices and in particular to a laser measurement system for measuring very small depthwise variations of surfaces relative to a focal plane.

2. Prior Art

In my prior U.S. Pat. No. 4,204,772, an optical probe is described based upon laser beam focusing characteristics on a null detector. In that system, a collimated light beam is passed off-center through a first lens and focused to a first point on a first surface coplanar with the focal plane of the lens. When the distance between the first surface and the optical probe carrying the collimated beam changes so that a second surface is presented, this second surface is no longer in the focal plane with the result that a laterally displaced image of the point of interception of the collimated beam with the point of the intersection of the optical axis of the system occurs. This lateral displacement is imaged back through the optical system to a type of null detector, namely a bicell detector. The primary focusing lens is then physically shifted along its optical axis to bring the focal plane into coplanar relationship with the second surface, the amount of lens movement being readily determined when the laterally displaced image point on the null detector is brought into coincidence with the center of the optical axis of the lens system, a null condition on the null detector. The distance through which the lens is physically moved then corresponds precisely to the distance between the first and second surfaces.

In prior U.S. Pat. No. 3,589,815 a non-contacting optical probe is disclosed. This probe gives a continuous reading of the distance from a given reference to a contoured surface. A collimated beam is directed parallel to the optical axis of a fixed objective lens whose optical axis defines a measuring axis. The beam is deviated at a slight angle towards the surface to be measured, with the angle defining a projection axis. A lens assembly focuses the collimated beam to a very small diameter image point in front of the objective lens on the measuring axis. Translation of the lens assembly causes the image point to move along the measuring axis a distance equal to the movement of the assembly. The spot is not defocused along the axis.

The light reflected from the surface is collected by the objective lens, directed through a filter and focused towards a split detector employing two photocells on opposite sides of a line, the detector lying in the focal plane of the lens. The movement of the lens assembly is measured, and compared with the point at which the amount of light detected by the two photocells is equal and above a predetermined value. The distance from the lens assembly to the surface is measured at this instant.

For measuring flat surfaces and for scanning areas such as small pits or grooves, as in screw threads, there must usually be relative motion between the probe or its internal optics and the surface being measured in order to sample an adequate locus of spots on a surface and to describe the depthwise variation of the surface being measured. For example, there is presently a problem in measuring the depth of screws and similar fasteners within a surface. There is a need for a non-contacting measurement device which will measure the depth variations over a small area of a surface, such as inspecting the depth of screw heads or rivet heads in holes, or the depth and pitch of threads, etc.

Optical scanning devices are known. For example, two dimensional galvanometers, rotating multi-faceted polygons and rotating wedges have been previously used to deflect a beam in a scanning motion in optical inspecting and measuring instruments. Such optical scanning devices may be employed as the optical beam scanning beams of the present invention.

An object of the present invention was to devise an optical non-contacting probe for high speed measurement of depth variations at a plurality of points in surfaces relative to a reference plane, without probe movement and for fine surface measurements and without movement of internal lenses other than in a scanning device.

SUMMARY OF THE INVENTION

The above object has been achieved by an optical measurement system wherein a forwardly directed collimated light beam is passed through focusing optics to a focal plane generally coinciding with the test surface. Light is retroscattered from the test surface and re-imaged into a retrobeam passing back along a path generally parallel to the optical axis and through the focusing optics to a partially reflective and transmissive filter transverse to the optical axis. Small depthwise variations in the test surface will cause variations in the retrobeam relative to the optical axis of the focusing optics. The extent of these variations in the retrobeam is indicative of the depthwise variations in the test surface.

The spatial variations of the retrobeam from the optical axis are determined by measuring the intensity of light transmitted through and reflected from the filter. First and second electrical signals proportional to these measurements are produced. Next, the first and second electrical signals are used to compute a centroid value for the retrobeam on the filter. This is in contrast to the prior art wherein the entire optical system was translated relative to the surface and along the optical axis to cause a beam null condition in a null detector.

In order to scan a plurality of spots on a surface, the lateral displacement between the forwardly directed beam and the optical axis is optically shifted but parallelism between the forwardly directed beam, prior to entering the scanner, and the optical axis is maintained. A new centroid value is computed, using electrical signals corresponding to measured light intensity transmitted through and reflected from the filter. The newly computed centroid value represents a lateral shift or displacement of the retrobeam on the filter relative to its prior position and the prior beam centroid. The difference in the two centroids is directly proportional to the depthwise variation in the test surface. By repeatedly shifting the lateral displacement of the forwardly directed beam relative to the optical axis with the scanner, a surface may be scanned at a locus of spots until the depth variations of the surface in a specified area are measured. This method allows fine measurement of the depth of a point relative to the focal plane without movement of any system components other than scanner motion.

Other advantages of the measurement system of the present invention are as follows: (1) high spatial resolution of the test surface which permits measurement of complex surfaces; (2) high speed measurements resulting from the non-contact nature of the system and (3) significant system versatility because the system can be configured for use over very small test surfaces, such as screw threads or over larger surfaces, such as exterior panels for aircraft or space craft.

BRIEF DESCRIPTION OF THE DRAWINGS

FIGS. 5-7 illustrate operation of wedges in a scanner of the type shown in FIG. 4a.

DESCRIPTION OF THE PREFERRED EMBODIMENT

Figure 1:
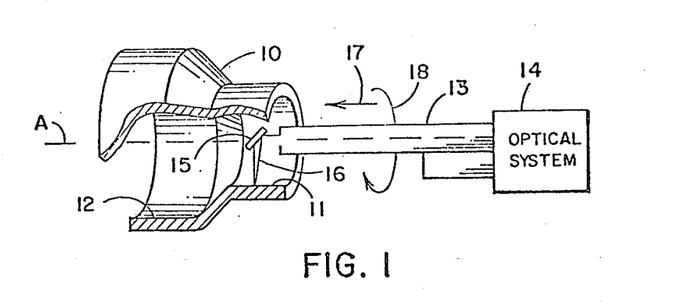
FIGS. 1-3 illustrate a surface measuring probe described in my prior patent application.
Figure 2:
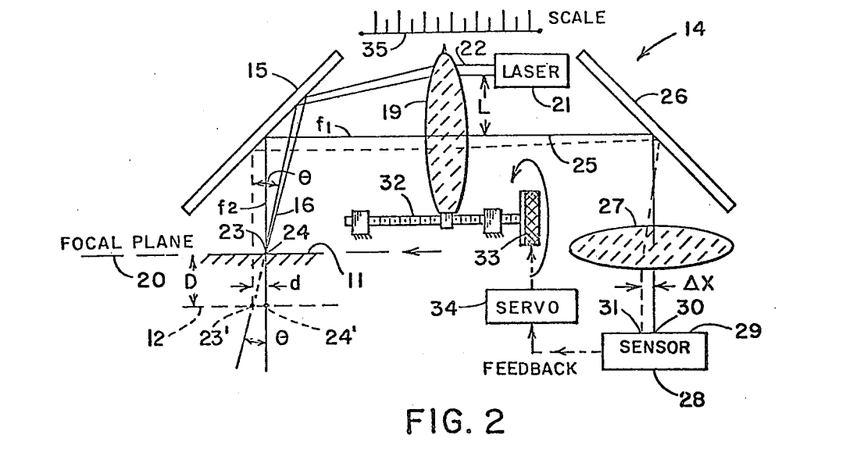
Figure 3:
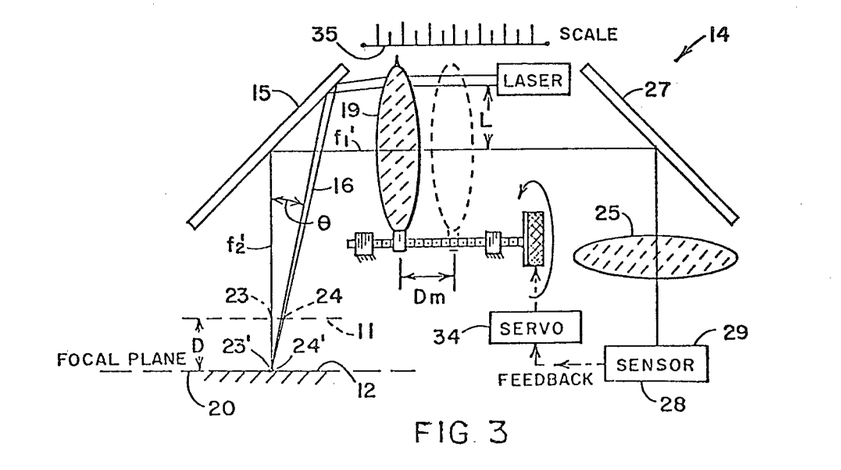

The following description with reference to FIGS. 1 through 3 was described in my prior U.S. Pat. No. 4,204,772. The system which is described relies on a null detector to establish when the focal plane for the focusing optics of a probe has or lacks depthwise variation with regard to a test surface. If such variation exists, the entire optical system is translated relative to the test surface until the focal plane of the system and the test surface coincide, as determined by the null detector.

Referring first to FIG. 1, a test object is shown, namely a mold 10 having internal first and second surfaces 11 and 12. Shown extending into one side of the mold along the axis of the mold is an optical probe 13 extending from an optical system 14. The probe 13 terminates in a 45° angled mirror 15 for passing a converging light beam 16 onto a first surface 11 of the mold 10.

In the particular example illustrated in FIG. 1, the optical system is to be used to measure the distance between, for example, the first and second surfaces 11 and 12; that is, the change in the radii of the internal cylindrical surfaces of the mold 10. Towards this end, the probe is first positioned so that the beam 16 strikes the surface 11 and then subsequently moved inwardly along the axis A of the probe in the direction of the arrow 17 so that the collimated beam 16 will strike the second surface 12. It should be understood that if the surfaces surrounding the probe are irregular rather than cylindrical surfaces, the relief of the irregularities of the internal surfaces can readily be measured by simply rotating the probe as indicated by the arrow 18.

Referring now to FIG. 2, the manner in which the foregoing described measurements are made will become evident. Essentially, the optical system again designated generally by the arrow 14 in FIG. 2 includes a first lens 19 positioned in front of the 45° angled mirror 15. The arrangement is such that the focal plane of the lens 19 coincides with the first surface 11 reproduced in the left portion of FIG. 2. Essentially, if fo represents the focal length of the lens 19, then because of reflection by the mirror 15, the following relationship exists:

$$f_1 + f_2 = f_o \quad (1)$$

where $f_1$ and $f_2$ represent the distance of the lens 19 from the mirror 15 and the distance of the focal plane 20 from the mirror 15, respectively.

Referring to the upper portion of FIG. 2, there is indicated a collimated light source preferably a laser 21 providing a collimated beam 22. Beam 22 is directed parallel to and displaced from the optical axis of the lens 19, the displacement being indicated by the letter L. Under these circumstances, the off-center passing of the collimated beam 22 through the lens 19 results in its being reflected by the mirror and being focused to a first point 23 coincident with the point 24 at which the optical axis represented by the line $f_2$ intercepts the first surface 11; that is, the focal plane.

Light from this first focused point 23 passing back along the optical axis and through the lens 19 as along the line 25 is reflected by a second 45° mirror 26 through a second lens 27 which re-images the first point 23 on a sensor means 28, having a sensor surface 29. Sensor means 28 is preferably a bicell detector, a type of null detector wherein two cells are placed side by side with a passive area, usually a line, centrally between the two cells. The re-imaged first point 23 will be re-imaged at the center of the sensor surface 29 as indicated at 30, this position corresponding to the optical axis of the second lens 27.

Consider now that the optical system 14 with the probe 13 is moved along the axis of the probe A in FIG. 1 until the beam 16 intercepts the second surface 12. In FIG. 2, the position of this second surface is indicated by the dashed line 12 but because this surface is spaced further away from the probe than the first surface 11, the point at which the collimated beam 16 intercepts the second surface will be laterally displaced from that point at which the optical axis intercepts the second surface. In other words, the second surface has been displaced from the focal plane 20 and thus there is a crossing over of the axis of the collimated beam 16 and the optical axis of the lens to result in the displacement. The impingement point of the collimated beam 16 on the second surface is depicted schematically in FIG. 2 as at 23' and the displacement from the point 24' at which the optic axis intersects the second surface 12 is indicated by the letter d.

If $\theta$ is the angle between the beam 16 and the optical axis along the dimension $f_2$ as indicated in FIG. 2, then:

$$\tan \theta = L/f_o = d/D \quad (2)$$

where d is the actual displacement of the second point 23' from the intersection point 24' of the optical axis with the second surface 12. From equation (2)

$$d = DL/f_o \quad (3)$$

Still referring to FIG. 2, there is indicated by the dashed line the re-imaging of the second point 23' on the second surface 12 by the second lens 27. The re-imaged second point is shown at 31 on the sensor surface 29, the same being laterally displaced from the position occupied by the first point image 30. This displacement is indicated by the notation $\Delta x$. If the magnification of the lenses 19 and 25 is the same; that is, if their respective focal lengths are equal, then the displacement $\Delta x$ on the sensor surface 29 will be identical to the displacement d on the second surface 12.

As mentioned briefly heretofore, the first lens 19 may now be physically moved along its optical axis as by means, for example, of a lead screw 32 and cooperating turning knob 33. This movement may be effected by simple manual turning of the knob 33 or having the same responsive to a servo 34 in turn responsive to an appropriate signal from the sensor 28 proportional to the displacement $\Delta x$. Essentially, the first lens 19 is moved along its optical axis until the second point image 31 is moved into coincidence with the position occupied by the first point image 30 on the sensor surface. This action essentially shifts the focal plane of the lens 19 from a position coplanar with the first surface 11 to a position coplanar with the second surface 12.

FIG. 3 illustrates the same set-up as shown in FIG. 2 except that the lens 19 has been shifted to bring its focal plane into coplanar relationship with the second surface 12. Since the lens 19 has now been moved to a position where its focal plane is coplanar with the second surface 12, the beam 16 will have its impingement point 24' on the second surface 12 coincident with the intersection of the optical axis with the second surface 12, this latter intersection point being indicated at 23'. Accordingly, it will be clear that light from this second point 24' will pass back along the optical axis of the lens 19 and through the lens to be re-imaged on the sensor 29 in the original center position.

The actual physical distance that the lens 19 has been moved along its optical axis is indicated by the letter Dm. This distance Dm is exactly equal to the distance between the first and second surfaces 11 and 12 which distance is indicated by the letter D in both FIGS. 2 and 3.

Accordingly, by measuring the physical distance the lens 19 is moved, there is provided an exact measure of the distance between the first and second surfaces. An appropriate scale such as indicated at 35 may be provided for directly indicating or enabling a simple reading out of this distance. Alternatively, of course, an appropriate electronic digital read-out connected to a motion transducer could be provided.

Where the servo 34 is to be used to control movement of the lens 19, appropriate transducer means in the sensor 28 will provide an output signal constituting a function of the displacement $\Delta x$ of the imaged point relative to the center point on the sensor surface so that as the lens is moved to bring its focal plane closer and closer to the second surface, this lateral displacement $\Delta x$ will decrease, decreasing the signal accordingly so that the lens will stop at the proper position.

In the example illustrated in FIGS. 2 and 3, the measured surface distance increased from the first surface to the second surface. If this distance decreased so that the second surface were above the first surface as viewed in FIG. 2, then the lateral displacement of the imaged first point on the sensor surface 29 would be on the other side of the center point 30. The output signal from the sensor could be made negative for displacements to the left and positive for displacements to the right so that the lead screw 32 will be turned in the proper direction for making the desired measurement.

From the foregoing, it will be further understood that with the servo feedback, a continuous reading-out of distances of various surfaces from the end of the probe can be provided while the probe is moving within a structure such as the mold 10. Moreover, when the probe is rotated about its axis A, there will be provided a continuous read-out of the internal surface spacing or relief. The probe can be designed with additional optical systems so that the cylindrical coordinates of any interior surface surrounding the probe can be provided simultaneously.

While the probe can be rotated to measure cylindrical coordinates of an interior surface, the axis of the probe need not be coaxial with the axis of the interior surface; that is, it may be off-set. Such offsetting causes no problem because even though the distance to the surface of the object is changing, the resulting measurements will indicate the circular profile as measured from such off-set position.

Rapidly Scanning a Surface

Figures 4, 5A, 5B, 5C, 6A, 6B, 6C, 7A, 7B, 7C:
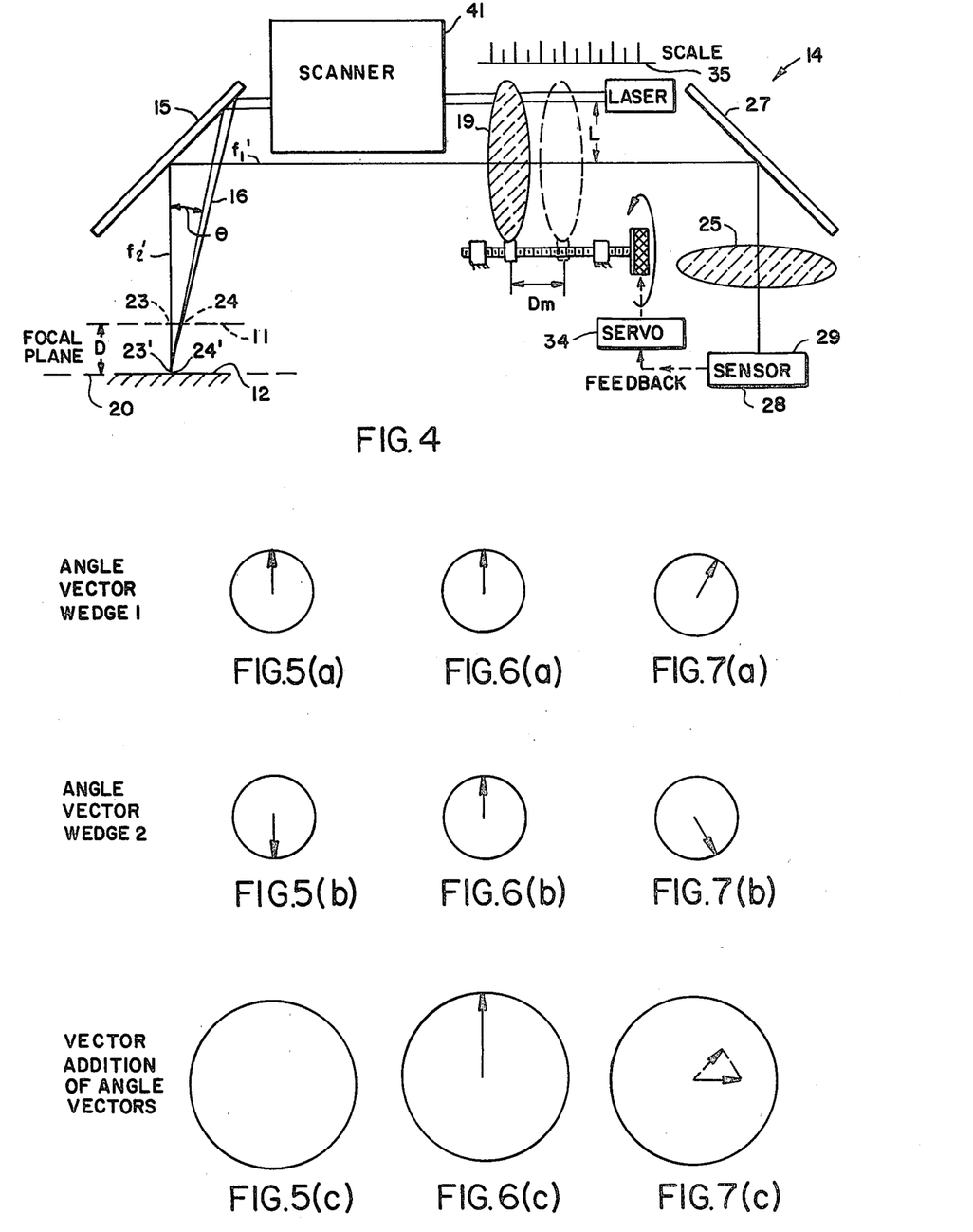
FIG. 4 illustrates the system of FIG. 3 with the improvement of a scanner for steering the beam over a surface.

The first effort at improving the measuring speed of the probe shown in FIG. 3 involved providing a beam deflecting scanner assembly 41, as shown in FIG. 4. The scanner 41 automatically deflects the beam at the focal plane. The point on detector 29 at which the retrobeam is focused depends upon the angular deviation of the laser beam from the optical axis. By changing the beam direction in both x and y axes, by means of the scanner assembly, the focus spot may be scanned over a finite area of the two-dimensional focal plane of the focusing lens 19. The scanner 41 may be a two-dimensional galvanometer, rotating multi-faceted prisms or rotating wedges.

Figures 4A, 8:
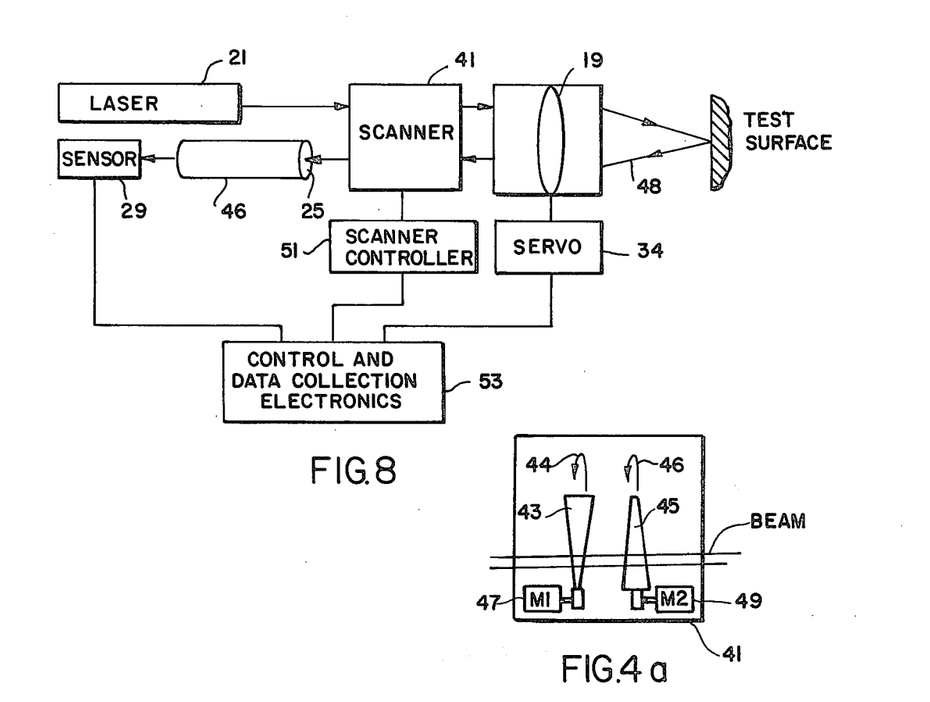
FIG. 4a illustrates a single type of prior art scanner for use in the system of FIG. 3.
FIG. 8 is a schematic representation for major electrical components for control of the apparatus and recording of information derived from the apparatus of FIG. 4.

A typical scanner, known in the prior art and illustrated in FIG. 4a, may consist of a pair of prism wedges 43, 45 aligned such that the triangular cross section of the wedges is traversed by beam 22, parallel to the optical axes of the wedges. Stepping motors 47 and 49 provide rotation of the wedges about their optical axes. The motors rotate at different speeds such that the beam deflection is continuously varied. Such beam deflection may be explained in terms of vector combinations from individual prism wedges. Each prism wedge is free to rotate independently of the other through a full circle in order to control the position of the beam. Because two adjacent wedge surfaces are not parallel, each wedge deflects light passing through it by a small angle. The amount of deflection by each wedge is constant, but the direction of deflection may be changed by rotating the wedge. Consider the case when the deflection in one wedge is in the opposite direction to the other. In this case, the two deflections cancel and light passes straight through the wedges. This situation is illustrated by FIGS. 5a and 5b, with each of the arrows in the respective figures representing a vector proportional to the extent and direction of deflection of light through a wedge. The resultant deflection obtained by combining the vectors of FIGS. 5a and 5b is 0, which is illustrated in FIG. 5c.

In the case where the deflection of both wedges is in the same direction, i.e. both wedges are aligned the same, as shown in FIGS. 6a and 6b, the resultant deflection will be the sum of the vectors as shown in FIG. 6c.

FIGS. 7a and 7b illustrate the wedges with arbitrary alignment. The vector produced by this alignment is the combination of the two as shown by the arrows in FIG. 7c, indicating the vector combination which selects point P within the circle defined by the vector of FIG. 6c, which is the largest amplitude vector. The purpose of FIG. 7c is to illustrate that any point within a circle may be selected by a proper alignment of the two wedges.

By rotating both wedges in the same direction, as indicated by the arrows 44 and 46 in FIG. 4a, at slightly different rates, a spiral locus of points may be defined in the focal plane of the beam. As previously mentioned, other types of optical scanners may be used.

As previously explained, if the measurement surface nearly or generally coincides with the focal plane, independently of where in the focal plane the beam is focused, the retroscattered light from the surface is collected, collimated and directed rearwardly in a direction parallel to the incident beam. When the collimated scattered radiation propagates back through the scanner assembly, it becomes parallel to the optical axis of the focusing lens 19 as well as the optical axis of the detector focusing lens 25. The on-or-off axis position of the returned spot is detected using the null or bicell detector positioned symmetrically with respect to the optical axis. A small gap between two symmetric detector halves is on the optical axis. When the retrobeam is centered on the gap, the focal plane of the beam precisely coincides with the test surface.

FIG. 8 shows the optical and electrical paths for control and data recording for the scanner of FIG. 4a. In FIG. 8 the scanning assembly 41 is operated by a scanner controller 51 which operates to control the two stepping motors previously described and keep them rotating at desired speeds so that a desired scanning pattern for the beam may be achieved. Controller 51 may employ a pair of shift registers, having different lengths with respect to each other, both driven by the same clock, with the output of the two shift registers used to drive the stepper motors. The system controller 53 may be a microprocessor with memory or separate discrete circuits.

As previously mentioned, the focusing optics 19 is translated by a position servo 34. The servo 34 seeks a null in the optical sensor 29, which may be a bicell detector, as previously explained. Lens 25 forms a portion of a receiver telescope 46 for focusing the retrobeam 48 onto sensor 29. The extent of translation is a coarse measure of the variation of the test surface from the initial focal plane prior to translation.

The scanner 41 shown in FIGS. 4 and 8 increases the speed at which small depth variations on the test surface may be measured. While this increase in speed is helpful, it may take several seconds to make a measurement depending on the speed at which the servo 34 can hunt for a null at the detector and record the position of the focusing optics, namely lens 19.

Improved Detector System

Figure 9:
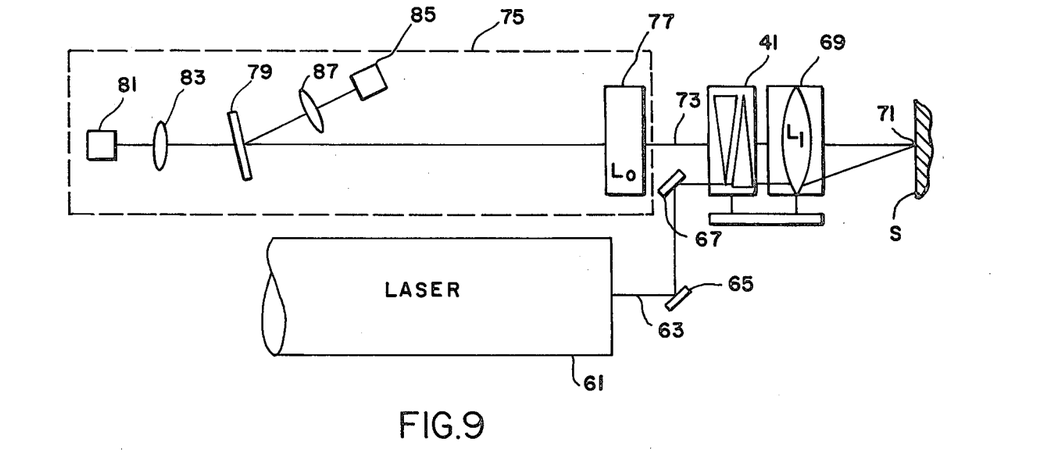
FIG. 9 is a plan view of an improved probe of the present invention featuring a new detector system for fine surface measurements.

It has been discovered that faster operation of the probe of FIG. 4 may be achieved by means of a new detector system shown in FIG. 9. FIG. 9 illustrates a non-contacting scanning laser surface probe of the present invention.

The source for the probe is the laser 61 having a collimated beam 63 emerging from a small aperture. The laser may be a compact helium-neon laser of low power, i.e. 2 mw, directing the beam onto mirrors 65 and 67 toward the test surface S. The laser 61 need not be a helium-neon laser, but may be a semiconductor diode laser which would be preferable to helium-neon because of higher output power and more compact size. Preferably, the laser is of the hard seal type, so that the probe can be used in areas of severe vibration and mechanical stress.

The beam 63 is directed through a scanner 41, identical to the scanner described with reference to FIG. 4 so that a spiral scan may be achieved. Such spiral scanning is known in the prior art. A focusing lens 69 brings the beam 63 to a focal spot 71. This spot or ideally a point is on the focal plane, as are other focal points in the locus of points established by the scanning head 41. The test surface S generally coincides with the focal plane, but has depthwise features to be measured. Such features may be pits, dips, cliffs, humps, or any form of continuous or discontinuous deviation from a smooth surface.

The measurement system of the present invention requires retro-imaging of the focal spot 71 by the focusing lens 69. Light returning from the surface S is deflected by the wedges in the scanning head 41 with an identical deflection as the incoming beam 63. Thus, the retrobeam 73 emerging rearwardly from the scanning head 41 is exactly parallel to the incoming laser beam between mirror 67 and scanning head 41. Light retro-imaged from the test surface S which is slightly in front of, or behind, the focal plane defined by the locus of beam spots will be slightly out of parallel. Such light is created when there are depthwise features in the test surface being inspected, such as pits, dips, cliffs, humps or other deviations from a smooth surface. Detecting the change in angle of the return beam attributable to a surface deviation is the function of the detector assembly which is grouped together as a receiver telescope, indicated by the dashed line 75.

The detector assembly is a telescope in the sense that it focuses the retrobeam 73 onto two photodetectors after being partially transmitted through and partially reflected from a neutral density filter 79. Each photodetector may be a silicon photodiode having a 5 mm. sensitive area.

The telescope includes an input objective lens 77 which focuses the retrobeam 73 onto the neutral density filter 79. Filter 79 is a partially reflective, partially transmissive filter whose transmission and reflection vary spatially. Preferably filter 79 is a piece of developed black and white film plate. The size of the film is preferably a 10 millimeter square, approximately 2.5 mm. thick including its transparent glass base. The film is exposed by means of a linear, variable optical density wedge so that the developed film has a transmission gradient in one direction consisting of a continuously variable optical density ranging from clear at one side to an optical black density of 3.0 at an opposite side. The filter may also be made by vapor depositing absorptive material on a glass substrate so that an absorption gradient, preferably a linear gradient, is produced transversely across the filter. Such a gradient may be produced by continuously increasing the thickness of absorptive material across the filter, with a linear variation in optical density being produced across the film. Midway between the sides, the filter is approximately partially reflective and partially transmissive and appears gray. Other types of filters could be used as long as there is some transmissivity and some reflectivity, for the wavelength of the retrobeam, which varies spatially and can be correlated with the beam position on the filter. Note that the direction of alignment of the optical density gradient on the film has some importance. This is because any depthwise variation of the test surface from the beam focal plane will cause a shift in the position of the retrobeam on the filter from a zero point, corresponding to no depthwise variation. The shifts in the retrobeam image on the filter will be a locus of points defining a line. This line is aligned parallel to the film optical density gradient. The midway point along the line, where the filter is equally reflective and transmissive, is a good point for alignment of the film with the retrobeam zero point. A linear variation in the filter is simplest to correlate beam position to readings of the two photodetectors and for this reason the linear exposure filter is preferred.

A first photodetector 81 is spaced behind the filter 79 for reading retrobeam transmission through the filter. A focusing lens 83 focuses the retrobeam 73 onto the first photodetector 81. Similarly, a second photodetector 85 is positioned to intercept light reflected from filter 79. A focusing lens 87 brings that portion of beam 73 which is reflected by filter 79 to a focal point on the photodetector 85.

Let $I_o F(x)$ be the intensity distribution of the image spot of the retrobeam, (mx) be the transmission function of the filter and (1-mx) be the reflection function of the filter. Note that x is the spatial co-ordinate along which spot is displaced from the zero point and m is the absorption factor of the filter, preferably a linear variable. The output of the detector 81, detecting the transmitted light $I_t$ is given by $$I_t = I_o m \int_{-\infty}^{\infty} xF(x)dx \qquad (4)$$

The output of the detector 85 detecting the reflected light $I_R$ is given by $$I_R = I_o \left[ \int_{-\infty}^{\infty} xF(x)dx - m \int_{-\infty}^{\infty} xF(x)dx \right] \qquad (5)$$

$$\int_{-\infty}^{\infty} xF(x)dx = \bar{x},$$

where $\bar{x}$ is the centroid for the beam spot on the filter. Hence $$\bar{x} = \frac{1}{m} \cdot \frac{I_t}{I_R + I_t} \qquad (6)$$

The last equation shows that the centroid of the spot can be precisely determined from intensity levels sensed by the photodetector. Small depthwise deviations in the test surface S from the beam focal plane, but which leave the beam essentially in focus, change the amount of parallelism in the retrobeam 73 thereby influencing the position where the retrobeam 73 impinges on the filter 79. This causes changes in the amounts of light received by the photodetectors 81 and 85, allowing for a calculation of the centroid value $\bar{x}$.

Let $\bar{x}_1$ be the value of a first computed centroid corresponding to a slight deviation on the test surface from the focal plane $y_1$. After the scanner steers the beam to a new location on the test surface with another deviation $y_2$ from the focal plane, another centroid value $y_2$ is computed corresponding to the new deviation using the signals from the photodetectors. The change in centroid values yields a proportional change in test surface deviation values in accord with the equation:

$$\bar{x}_2 - \bar{x}_1 = k(y_2 - y_1) \qquad (7)$$

where k is a constant of proportionality which depends on the system optics and be either calculated or determined empirically.

The measurement system of the present invention does not depend upon uniform reflectivity of the test surface from point to point. However, the test surface must have at least a slight amount of reflectivity, i.e. cannot be totally absorptive. If a totally absorptive test surface is encountered, it should be coated so that it is at least slightly reflective so that the retrobeam 43 may be formed. Note that the focusing lenses 69, 83 and 87 all have fixed focal lengths.

Figure 10:
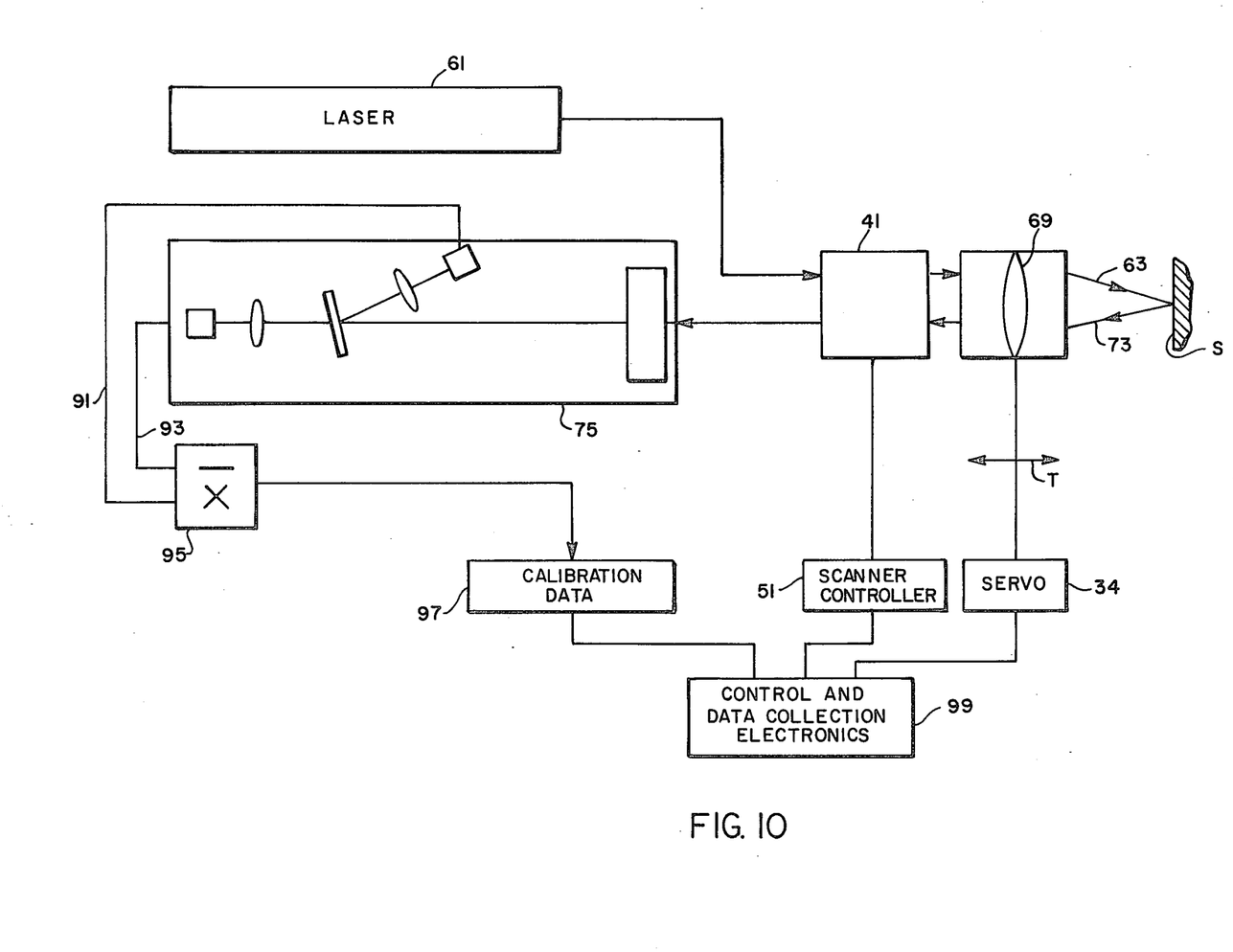
FIG. 10 is a plan view of the improved probe of FIG. 9 adapted for both coarse and fine surface measurements.

In order to extend the range of the instrument shown in FIG. 9 from fine variations which require that the retrobeam remain in focus to coarse variations where focus is lost the lens 69 may be mounted for linear movement, as shown in FIG. 10. When a deep pit in the test surface causes the spot 71 to go completely out of focus the lens 69 may be translated slightly to re-establish focus on the test surface, i.e. bringing the focal plane for beam 63 into coincidence with the test surface. This is achieved in the same manner as translation of lens 19 in FIG. 3. A beam splitter 89 samples the retrobeam and sends a beam sample to be focused on sensor 91, preferably a bicell detector similar to detector 28 in FIG. 3. Without translation the fine mode of operation allows measurements of depthwise deviations from the focal plane of only a few thousandths of an inch. With translation, the range of the probe is extended indefinitely, limited only by the practical extent of translation.

The coarse translation may be in steps of one or more tenths of an inch. This dimension is added to the fine measurement from the original lens starting position. To measure the position of a screw head in a recess, it may be possible to focus the beam to the top edge of the recess and then scan the recess. However, if the screw is set deeply focus will be lost between the top of the recess and the head. In this situation, the device is first operated in the coarse mode to put the head in focus. This yields the general depth of the head. Next the entire head may be scanned in the fine mode to determine whether the head is level or whether the head has been damaged. In the situation where the head is almost coplanar with the top edge of the recess, say within a few thousandths, operation in the coarse mode is not required.

The electronics for controlling operation of the present invention may be viewed in FIG. 10. Telescope 75 may be seen to have a pair of outputs 91, 93 each from one of the photodetectors in the telescope. The two output lines carry signals representing photodetector intensity levels so that the computation of the centroid, $\bar{x}$, may be carried out by an analog divider represented by the block 95. Note that the value for "m" must be supplied to the analog divider. For that reason, a filter which consists of a film exposed by a linear wedge has ideal simplicity inasmuch as "m" will be a linear variable. Once the value for $\bar{x}$ is computed, the value may be used to determine a depthwise beam variation from the focal plane in accord with equation (7). The computer 99 then activates the scanner controller 51 so that a new beam position is enabled and another computation of $\bar{x}$ and another depthwise beam variation may be determined. The sequence continues, until a spiral scan of the test surface has been made.

If a pit, crack or other dislocation is encountered by which focus for the beam 63 is completely lost, the servo 34 may be used to translate the focusing optics 69 in the direction indicated by the double-headed arrows T. The extent of translation by the servo is recorded, and that amount added or subtracted, depending on the direction of motion, to the depthwise deviation which is computed as described.

What is claimed is:

1. An optical method for measuring fine depth variations of a test surface relative to a focal plane comprising,
   (a) passing a forwardly directed, collimated light beam through a beam focusing lens having an optical axis and a focal plane generally coinciding with a test surface having depthwise variations to be measured, said light beam aimed at said test surface in a direction parallel to and displaced from the optical axis of the lens so that said collimated beam is focused to a spot on the test surface coinciding with the point of intersection of the optical axis of said lens with said focal plane,
   (b) re-imaging retro scattered light from said test surface passing back along a path generally parallel to the optical axis and through the lens and through a partially reflective and transmissive filter having spatially variable reflectivity and transmissivity, said filter disposed transverse to the optical axis,
   (c) measuring light intensity transmitted through and reflected from said filter and producing corresponding first and second electrical signals proportional to the measurements,
   (d) computing a centroid value for the retro beam using said first and second electrical signals, and
   (e) relating the computed centroid value to a depthwise deviation of the beam from said focal plane.

2. The method of claim 1 further comprising, repeatedly shifting the displacement between said forwardly directed beam and said optical axis but maintaining said forwardly directed beam parallel to the optical axis, and
   repeating steps (a)–(e) of claim 1 each time the displacement shifting step of this claim is performed.

3. The method of claim 2 further defined by moving said beam focusing lens along its optical axis whenever the deviation of the focal plane from the test surface causes loss of focus in the retrobeam, the lens moved in a direction and to an extent that the focal plane and the test surface coincide, the extent of lens motion defining a coarse depth variation from the original lens position.

4. Optical apparatus for measuring depthwise variations of a test surface relative to a focal plane comprising,
   a first lens having an optical axis and a focal plane generally coinciding with a test surface, said test surface having depthwise variations to be measured,
   a source of collimated light positioned to direct a collimated beam through said first lens in a direction parallel to and displaced from the optical axis of said first lens so that said collimated beam is focused to a spot on the test surface coinciding with the point of intersection of the optical axis of said lens with said focal plane,
   a partially reflective and transmissive filter having a spatially variable pattern of reflectivity and transmissivity disposed transverse to the optical axis rearward of said lens,
   a second lens disposed along the optical axis for intercepting retro scattered light from said test surface and focusing said retro scattered light on said filter,
   a first light detector means positioned to intercept light transmitted through said filter for producing a first electrical signal responsive to the intensity of light transmitted through said filter,
   a second light detector means positioned to intercept light reflected from said filter for producing a second electrical signal responsive to the intensity of light reflected from said filter,
   circuit means connected to said first and second light detector means for computing a beam filter centroid value from said first and second electrical signals and for relating said centroid value to a depthwise deviation of the beam from said focal plane.

5. The apparatus of claim 4 further comprising,
   an optical beam scanning means comprising a pair of rotating wedges aligned along said optical axis between said light source and said test surface for steering said beam along a selected locus of spots on the test surface, and
   control means for enabling said beam scanning means to steer said beam to a new measurement point.

6. The apparatus of claim 4 further defined by servo means operatively associated with said first lens for physically moving said first lens along its optical axis to move the position of the focal plane.

7. Optical scanning apparatus for measuring depthwise variations of a test surface relative to a focal plane comprising,
   a first lens having an optical axis and a focal plane coinciding with a test surface, said test surface having depthwise variations to be measured,
   a source of collimated light positioned to direct a collimated beam through said first lens in a direction parallel to and displaced from the optical axis of said first lens so that said collimated beam is focused to a spot on the test surface coinciding with the point of intersection of the optical axis of said lens with said focal plane,
   an optical beam scanning means aligned along said optical axis between said light source and said test surface for steering said beam along a selected locus of spots on the test surface,
   a partially reflective and transmissive filter having a spatially variable pattern of reflectivity and transmissivity disposed transverse to the optical axis rearward of said lens and beam scanning means,
   a second lens disposed along the optical axis for intercepting retro scattered light from said test surface and focusing said retro scattered light on said filter,
   a first light detector means positioned to intercept light transmitted through said filter for producing a first electrical signal responsive to the intensity of light transmitted through said filter,
   a second light detector means positioned to intercept light reflected from said filter for producing a second electrical signal responsive to the intensity of light reflected from said filter, circuit means connected to said first and second light detector means for computing a beam filter centroid value from said first and second electrical signals and for relating said centroid value to a depthwise deviation of the beam from said focal plane, and control means for enabling said beam scanning means to steer said beam to a new measurement point.

8. The apparatus of claim 7 further defined by means operatively associated with said first lens for physically moving said first lens along its optical axis to move the position of the focal plane.

9. Measuring axial deviations of a beam retro scattered from a test surface receiving an incident, focussed, light beam through a beam focussing lens having a focal plane, the light beam collimated in a direction parallel to and displaced from the optical axis of the lens so that the collimated beam is focussed to a spot on the test surface coinciding with the point of intersection of the optical axis of said lens with said focal plane, by the method comprising, re-imaging retro scattered light from the test surface passing back along a path generally parallel to the optical axis and through the lens and through a partially reflective and transmissive filter having spatially variable reflectivity and transmissivity, said filter disposed transverse to the optical axis, measuring light intensity transmitted through and reflected from said filter and producing corresponding first and second electrical signals proportional to the measurements, computing a centroid value for the retro beam using said first and second electrical signals, the centroid value being a measure of the axial deviation of the retro scattered beam from the optical axis.

10. The method of claim 9 further defined by relating the computed centroid value to a depthwise deviation of the beam from said focal plane.

* * * * *